US008886221B1

(12) United States Patent
Zou (10) Patent No.: US 8,886,221 B1
(45) Date of Patent: Nov. 11, 2014

(54) MOBILE DEVICE LOCATION ESTIMATION USING LOCAL LOCATION DATA

(71) Applicant: Jian Zou, Chapel Hill, NC (US)

(72) Inventor: Jian Zou, Chapel Hill, NC (US)

( * ) Notice: Subject to any disclaimer, the term of this patent is extended or adjusted under 35 U.S.C. 154(b) by 0 days.

(21) Appl. No.: 14/277,860

(22) Filed: May 15, 2014

(51) Int. Cl.
*H04W 88/02* (2009.01)
*G01S 5/10* (2006.01)

(52) U.S. Cl.
CPC .................................. *G01S 5/10* (2013.01)
USPC ............................................... 455/456.1

(58) Field of Classification Search
USPC ........................................ 455/456.1, 456.5
See application file for complete search history.

(56) References Cited

U.S. PATENT DOCUMENTS

| | | | |
|---|---|---|---|
| 8,494,554 B2 * | 7/2013 | Marti et al. ................. | 455/456.1 |
| 8,634,853 B2 * | 1/2014 | Bogatin ....................... | 455/456.1 |
| 8,634,860 B2 * | 1/2014 | Huang et al. ................ | 455/456.6 |
| 2012/0309410 A1 * | 12/2012 | Marti et al. ................. | 455/456.1 |
| 2012/0309428 A1 * | 12/2012 | Marti et al. ................. | 455/456.5 |
| 2013/0178230 A1 * | 7/2013 | Marti et al. ................. | 455/456.1 |
| 2013/0263440 A1 * | 10/2013 | Lee et al. ..................... | 29/605 |
| 2014/0171100 A1 * | 6/2014 | Marti et al. ................. | 455/456.1 |

* cited by examiner

*Primary Examiner* — Diane Mizrahi (57) ABSTRACT

Methods, program products, and systems of mobile device location estimation using local location data. For example, a method includes: detecting one or more wireless access gateways on a mobile device; for at least one detected gateway, determining whether or not the location data of the gateway exists on the device, the location data including one or more of: a location estimate of the gateway; an uncertainty value associated with the estimate; and a confidence value related to the likelihood that the gateway is stationary; determining whether or not a condition related to location estimation of the device is true; determining a location estimate of the device using the existing location data of the detected gateways on the device or other location estimation methods based on the determination of the condition.

30 Claims, 9 Drawing Sheets

MOBILE DEVICE LOCATION ESTIMATION USING LOCAL LOCATION DATA

TECHNICAL FIELD

This disclosure relates generally to geographic location determination.

BACKGROUND

Mobile devices have become widely adopted by the public. Mobile devices include smart phones and feature phones, personal digital assistant (PDA) devices, tablets, laptops, wearable computing devices in various forms and other portable computing devices. Their mobility has given rise to numerous location-based functionalities and services implemented on them. A prerequisite to these functionalities and services is the ability of a mobile device to estimate its geographic location.

Two groups of systems and methods can be used by a mobile device to estimate its location.

The first group is based on navigation satellite. A mobile device can be equipped with one or more receivers of one or more global navigation satellite systems, such as the Global Positioning System (GPS). Such device can estimate its current location based on signals from relevant navigation satellites. Navigation satellite based methods require an unobstructed view of the sky to function properly. They work poorly or not at all when satellite signals are attenuated or interfered significantly (e.g. inside a building with thick walls). Associated latency, the delay from requesting a location estimate to obtaining it, can be significant. Required power consumption can be nontrivial.

The second group is based on location server. A location server can be a system which is configured to provide a location estimate of a mobile device based on environmental information collected on the device. An exemplary location server based method can be described as the following. The device can collect environmental information (e.g. identifiers of detected wireless access routers and cell towers). The device can transmit the collected information to a location server. Upon receiving necessary information from the device, the location server can generate a response and transmit it back to the device. Upon receiving the response, the device can process it to obtain an location estimate.

A location server can be remote. A remote location server is connected to the mobile device via a wireless communications network, a wired network or a combination of both. A mobile device can utilize a remote location server based method only when it is connected to the server. As two-way communications between the mobile device and the remote location server are required in such method, associated latency is dependent on the state of the connecting network. It can be highly variable. Accuracy of estimation depends on many factors which can not be controlled by the device, including the configuration and method used on the remote server. Location security and mobile device user's privacy can be comprised as a result of the fact that information related to device location is transmitted over network to a remote server and server response is transmitted back to the device over network. Each transmission can potentially be exploited by a malicious attacker or eavesdropper.

A location server can also be local. A local location server is entirely implemented on a mobile device. Using local location server can mitigate or avoid network related limitations in remote location server based methods. However, for a local location server to function independently and satisfactorily, it needs to store a large amount of data covering a large geographic area on the device. It also needs to be able to perform significant amount of data processing on the device within a reasonably short time. Those requirements are difficult to meet by many current mobile devices. In addition, related power consumption would be significant. Thus, independent local location server is rarely, if at all, used on current mobile devices.

Navigation satellite based and remote location server based methods can be used in combination. They can be combined in numerous ways. For example, they can be combined sequentially where the next method starts only when the previous one fails. They also can be combined parallel where two methods run at the same time. Combination provides higher estimation availability since any one method working would provide a location estimate. Parallel combination of two methods reduces overall latency to the shorter between the two. However, almost all other limitations are not addressed. Some are even worsened by combination. For example, total power consumption can be the sum of that of each method in a combination. Maximum possible latency can be the sum of latency of each method in a sequential combination. Potential compromise of location security and user privacy in remote location server based method can not be mitigated simply by its combination with other method.

A few other observations related to location estimation on a mobile device can be made:

1. Many stationary wireless access gateways exist today. Wireless access gateways include, for example, cell towers, wireless access routers of a wireless local area network (WLAN), a metropolitan area network (MAN), or a personal area network (PAN). When they broadcast wireless signals, their signals can be detected by a mobile device equipped with a properly configured wireless transceiver within their range. Estimates of their geographic locations can provide useful information about the location of the mobile device.
2. Location estimates can be noisy. There can be occasions that the estimated location of a stationary wireless access gateway differs substantially from its true geographic location.
3. Not all wireless access gateways are stationary. Wireless routers mounted on mobile vehicles and wireless routers implemented by a WiFi Direct™ enabled device operating in WiFi Direct™ mode can be mobile. Estimates of their geographic locations should not be used in determining a mobile device's location.
4. The total number of wireless access gateways whose signals can be detected by a mobile device carried by a typical user can be limited. Location estimates and other useful information of such wireless access gateways can be stored entirely on some mobile devices, and can be processed within a reasonably short time by such devices.

SUMMARY

Methods, program products, and systems of mobile device location estimation using local location data are disclosed. In general, in one aspect, a mobile device can scan and detect one or more wireless access gateways. For at least one detected gateway, the device can determine whether or not the location data of the gateway exists on the device, the location data including at least one of: a location estimate of the gateway; an uncertainty value associated with the location estimate; or a confidence value related to at least one of: the likelihood that the gateway is stationary; the likelihood that the true geographic location of the gateway is inside a geographic area defined by the location estimate; or the likelihood that the true geographic location of the gateway is inside a geographic area defined by the location estimate and the associated uncertainty value. The device can determine whether or not a condition related to location estimation of the device is true.

The device can determine a final location estimate of the device, in response to the determination of the condition, using at least one of: a signal from a navigation satellite; data from another different computerized device; or a tentative location estimate of the device, determined using one or more of: the existing location data on the mobile device of one of the detected wireless access gateways; or an estimate of a distance between the device and one of the detected wireless access gateways.

In some embodiments, the device can update the existing location data on the device, of at least one detected wireless access gateway, using at least one of: the final location estimate of the device; an uncertainty value associated with the final location estimate of the device; an estimate of a distance between the device and the detected gateway; or the existing location data on the device of the detected gateway.

In some embodiments, the device can create and store on the device, the location data of at least one of the detected wireless access gateways, using at least one of: the final location estimate of the device; an uncertainty value associated with the final location estimate of the device; or an estimate of a distance between the device and the detected gateway.

The techniques described in this specification can be implemented to achieve the following exemplary advantages.

In some embodiments, when properly implemented and configured, and when one or more wireless access gateways are detected on a mobile device, they can potentially determine a location estimate of the device using only detected information of the gateways and location data stored on the device, without relying on navigation satellites or a remote location server. Latency and related power consumption can potentially be reduced in comparison with those in a navigation satellite based method or a remote location server based method. Location security and user privacy concerns associated with a remote location server based method can potentially be mitigated.

In some embodiments, when properly implemented and configured, they can potentially identify wireless access gateways that are mobile, preventing related location estimation errors from occurring persistently.

The details of one or more embodiments of mobile device location estimation using local location data are set forth in the accompanying drawings and the description below. Other aspects, features, and advantages will become apparent from the description, the drawings and the claims.

DETAILED DESCRIPTION

Overview of Mobile Device Location Estimation Using Local Location Data

In the following detailed description, numerous specific details are disclosed to provide a thorough understanding of some embodiments. However, it will be understood by persons of ordinary skills in the art that some embodiments may be practiced without those specific details. In some instances, well-known methods, procedures, components units have not been described in detail in order not to obscure the discussion.

Figure 1:
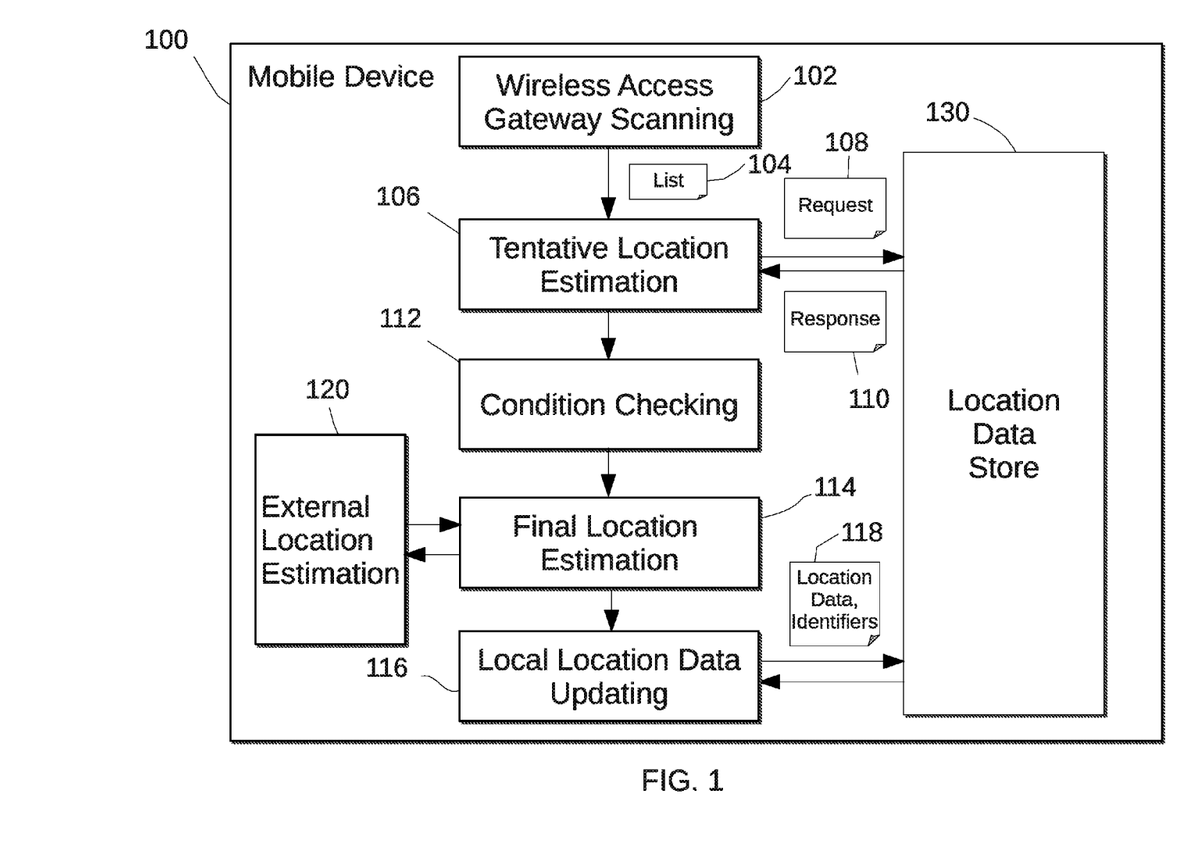
FIG. 1 is a block diagram providing an overview of exemplary techniques of mobile device location estimation using local location data.

FIG. 1 is a block diagram providing an overview of exemplary techniques of mobile device location estimation using local location data. Mobile device 100 is an exemplary mobile device configured to estimate its location using local location data. Device 100 can perform wireless access gateway scanning operations 102 to detect one or more wireless access gateways (e.g., cell towers, wireless routers, or other apparatus capable of emitting wireless signals). Scanning operations 102 can produce an identifier list 104. An identifier of a wireless access gateway uniquely identifies the gateway. An identifier can include one or more of the following: identification information of a cell tower; media access control (MAC) address of a wireless router; or any other identification information of an apparatus capable of emitting wireless signals. Each identifier in list 104 can represent a wireless access gateway whose signals have been detected and measured by device 100. Scanning operations 102 can detect any number of wireless access gateways.

Device 100 can perform tentative location estimation operations 106 to determine a tentative location estimate of device 100. In some embodiments, estimation operations 106 can additionally determine an uncertainty value associated with the tentative estimate.

Estimation operations 106 can send request 108 to location data store 130. Request 108 can include all or a portion of identifiers in list 104. Store 130 can be implemented entirely on device 100 and can be configured to store identifiers and location data of wireless access gateways.

In a first group of embodiments, the location data of a wireless access gateway can include a location estimate of the gateway. In a second group of embodiments, the location data of a gateway can include a location estimate of the gateway and an uncertainty value associated with the location estimate. In a third group of embodiments, the location data of a gateway can include a location estimate of the gateway and a confidence value. In a fourth group of embodiments, the location data of a gateway can include a location estimate of the gateway, an uncertainty value associated with the location estimate and a confidence value.

In some embodiments, the location estimate in the location data of a gateway can include a latitude coordinate and a longitude coordinate. In some embodiments, the location estimate can include a numerical or other code designating a predetermined geographic area (e.g. ZIP code and ZIP+4 code used by the United States Postal Service). The uncertainty value in the location data of a gateway can indicate an estimation accuracy of the location estimate with which it is associated. In some embodiments, the uncertainty value can be a value indicating the estimated maximum distance between the location estimate with which it is associated, and the true geographic location of the gateway. In some embodiments, the uncertainty value can be one or more numerical or other codes designating predetermined geographic areas.

In some embodiments, the confidence value in the location data of a gateway can be related to one or more of the following: the likelihood that the gateway is stationary; the likelihood that its true geographic location is inside a geographic area defined by the location estimate in the location data; or the likelihood that its true geographic location is inside a geographic area defined by the location estimate and the uncertainty value associated with the estimate in the location data. In some embodiments, the confidence value can represent the likelihood that the gateway is stationary, and the distance between its true geographic location and the location estimate in the location data is less than the associated uncertainty value.

Upon receiving request 108, for each identifier in request 108, store 130 can determine whether or not the location data of corresponding gateway exists on device 100. Store 130 can retrieve existing location data for identifiers in request 108, and send response 110, containing all of the retrieved location data, back to estimation operations 106.

Upon receiving response 110, estimation operations 106 can determine a closeness value between device 100 and each detected gateway whose location data is present in response 110. The closeness value can represent an estimate of a distance between device 100 and the gateway. In some embodiments, the closeness value can be determined using a received signal strength indication (RSSI) measured at device 100 during scanning operations 102. In some embodiments, the closeness value can be determined using a round-trip time of a signal between device 100 and the gateway. In some embodiments, the closeness value can be determined using a bit error rate of a signal emitted by the gateway.

In the first group of embodiments, estimation operations 106 can determine a tentative location estimate of device 100, based on location data in response 110. One exemplary process can be described as the following. Device 100 can determine the tentative location estimate to be an invalid location estimate which does not represent any geographic location on earth when response 110 contains no location data. In contrast, a valid location estimate represents a geographic location on earth. In some embodiments, the invalid location estimate can have latitude coordinate outside the interval between −90 degrees and 90 degrees. In some embodiments, the invalid location estimate can be a numerical or other code designating a non-existing geographic area. Device 100 can determine the tentative location estimate to be the same as the location estimate in the only location data when only one location data is present in response 110. When two or more location data are present in response 110, device 100 can determine the tentative location estimate using all location data in response 110. In embodiments where the location estimate in the location data of a wireless access gateway includes a latitude coordinate and longitude coordinate, device 100 can determine the latitude coordinate and the longitude coordinate of the tentative location estimate to be the arithmetic mean of latitude coordinates and longitude coordinates in all location data in response 110, respectively. Further details of one exemplary process will be discussed below in reference to FIG. 2. In embodiments where the location estimate in the location data of a wireless access gateway includes a numerical or other code designating a predetermined geographic area, device 100 can determined the code in the tentative location estimate to be the one which appears most often in all location data in response 110.

In the second group of embodiments, estimation operations 106 can determine a tentative location estimate of device 100 and an associated uncertainty value, based on location data in response 110 and the closeness values between device 100 and corresponding gateways. Further details of one exemplary process will be discussed below in reference to FIG. 3.

In the third group of embodiments, estimation operations 106 can determine a tentative location estimate of device 100, based on the location data in response 110. One exemplary process can be described as the following. For each location data in response 110, device 100 can determine whether or not it is meaningful by comparing the confidence value in the location data against a predetermined threshold. Device 100 can then determine the tentative location estimate through the exemplary process of estimation operations 106 for the first group of embodiments as described above, using only meaningful location data.

In the fourth group of embodiments, estimation operations 106 can determine a tentative location estimate of device 100 and an associated uncertainty value, based on the location data in response 110 and the closeness values between device 100 and corresponding gateways. One exemplary process can be described as the following. For each location data in response 110, device 100 can determine whether or not it is meaningful by comparing the confidence value in the location data against a predetermined threshold. Device 100 can determine the tentative location estimate and the associated uncertainty value through the exemplary process of estimation operations 106 for the second group of embodiments described above, using only meaningful location data.

Condition checking operations 112 can determine whether a condition related to location estimation of device 100 is true or not.

In some embodiments, checking operations 112 can determine the condition to be true when a condition value determined based on location data in response 110 satisfies a predetermined constraint.

For the first group of embodiments, one exemplary process of checking operations 112 can be described as the following. Device 100 can determine a condition value to be 1000 when there is no location data in response 110 and −1 when there is only one location data in response 110. Device 100 can determine the condition value to be the largest distance between two location estimates in any two location data in response 110. Device 100 can determine the condition to be true when and only when the condition value is less than a predetermined value, e.g. 500.

For the second group of embodiments, one exemplary process of checking operations 112 can be described as the following. Device 100 can determine a condition value to be 1 when there is no location data in response 110 and −1 when there is only one location data in response 110. Device 100 can determine a first value to be the largest distance between two location estimates in any two location data in response 110 and a second value to be the sum of the two uncertainty values associated with the two location estimates, when there are two or more location data in response 110. Device 100 can determine the condition value to be the result of the first value subtracting the second value when there are two or more location data in response 110. Device 100 can determine the condition to be true when and only when the condition value is less than 0.

For the third and fourth group of embodiments, one exemplary process of checking operations 112 can be described as the following. For each location data in response 110, device 100 can determine whether or not it is meaningful by comparing the confidence value in the location data against a predetermined threshold. Device 100 can determine a condition value to be the smallest confidence value among those in meaningful location data in response 110 or 0 when there is no meaningful location data in response 110. Device 100 can determine the condition to be true when and only when the condition value is greater than a predetermined value, e.g. 0.5.

For the fourth group of embodiments, another exemplary process of checking operations 112 can be described as the following. For each location data in response 110, device 100 can determine whether or not it is meaningful by comparing the confidence value in the location data against a predetermined threshold. Device 100 can determine whether or not the condition is true through the exemplary process of checking operations 112 for the second group of embodiments described above, using only meaningful location data.

In some embodiments, checking operations 112 can determine the condition to be true when a random value satisfies a predetermined constraint. The random value can have a probability distribution function or probability density function that is either predetermined or influenced by the location data in response 110. One exemplary process of checking operations 112 can be described as the following. Device 100 can generate a random number, r, with uniform distribution over the interval between 0 and 1, inclusive of both 0 and 1. Device 100 can determine the condition to be true when and only when $r<0.95$.

For the third and fourth group of embodiments, one exemplary process of checking operations 112 can be described as the following. Device 100 can determine a value m to be the maximum confidence value among those in the location data in response 110 or 1 when there is no location data in response 110. Device 100 can determine a value n to be the total number of wireless access gateways whose location data are present in response 110. Device 100 determines a value, z, to be $z=m^{(0.03 \times n)}$. Device 100 can generate a random number, r, with uniform distribution over the interval between z−1 and z, inclusive of both z−1 and z. Device 100 can determine the condition to be true when and only when r is less than zero, i.e. $r<0$.

When the condition is determined to be true in checking operations 112, final location estimation operations 114 can determine a final location estimate of device 100 using the tentative location estimate as determined in estimation operations 106. In the second and fourth group of embodiments, device 100 can determine the uncertainty value associated with the final location estimate of device 100 using the uncertainty value associated with the tentative estimate.

When the condition is determined to be not true in checking operations 112, estimation operations 114 can determine the final location estimate of device 100 using external location estimation operations 120. Estimation operations 120 can determine a location estimate of device 100 using any location estimation method other than the ones disclosed in this specification. In some embodiments, estimation operations 120 can use a navigation satellite based method or a remote location server based method or a combination of the two. Estimation operations 114 can determine the final location estimate using the location estimate as determined in estimation operations 120. In the second and fourth group of embodiments, estimation operations 120 can additionally determine an uncertainty value associated with the location estimate of device 100. Estimation operations 114 can additionally determine an uncertainty value associated with the final location estimate of device 100 using the uncertainty value determined in estimation operations 120.

Local location data updating operations 116 can create a location data for each detected gateway when no location data of the gateway is present in response 110.

For the first group of embodiments, updating operations 116 can determine the location estimate in the created location data using the final location estimate of device 100 as determined in estimation operations 114.

For the second group of embodiments, updating operations 116 can first determine a closeness value between device 100 and each detected wireless access gateway whose location data is not present in response 110. The closeness value can represent an estimate of a distance between device 100 and the gateway. One exemplary process for determining the closeness value can be the same as the one used in estimation operations 106. Updating operations 116 can determine the location estimate and the associated uncertainty value in the created location data using the final location estimate of device 100 and the associated uncertainty value as determined in final location estimation operations 114, the closeness value between device 100 and the gateway as determined above. Further details will be discussed below in reference to FIG. 4.

For the third group of embodiments, updating operations 116 can determine the location estimate in the created location data using the final location estimate of device 100. Device 100 can determine the confidence value in the created location data of the gateway to be a predetermined default numerical value between 0 and 1, or a predetermined numerical value between 0 and 1 based on the category of the gateway (e.g. cell tower or wireless router or others), or a numerical value between 0 and 1 determined based on other information related to the gateway. One exemplary process can be described as the following. Device 100 can determine the confidence value to be 0.9999 when a gateway is a cell tower, 0.99 when a gateway is a wireless router or 0.95 when the gateway is something else.

For the fourth group of embodiments, updating operations 116 can determine the location estimate and the associated uncertainty value in the created location data following the exemplary process of updating operations 116 for the second group of embodiments as described above. Updating operations 116 can determine the confidence value in the created location data of the gateway following the same exemplary process of updating operations 116 for determining the confidence value for the third group of embodiments as discussed above.

Updating operations 116 can update the location data of each detected gateway whose location data is present in response 110.

For the first group of embodiments, updating operations 116 can determine the location estimate in the updated location data of the gateway using the final location estimate of device 100.

For the second group of embodiments, updating operations 116 can determine the location estimate and the associated uncertainty value in the updated location data of the gateway using the final location estimate of device 100 and the associated uncertainty value as determined in final location estimation operations 114, and the closeness value between device 100 and corresponding gateway as determined in estimate operations 106 and the existing location data of the gateway in response 110. Further details will be discussed below in reference to FIG. 5.

For the third group of embodiments, updating operations 116 can determine the location estimate in the update location data of the gateway using the final location estimate of device 100 as determined in final location estimation operations 114. In embodiments where the confidence value is a numerical value between 0 and 1, one exemplary process of determining the confidence value in the updated location data can be described as the following. Device 100 can determine a distance, d, between the location estimate in the updated location data of the gateway and the location estimate in the existing location data of the gateway in response 110. Device 100 can determine the confidence value in updated location data, $m_2$, to be $$m_2 = \frac{c_1 \times m_1}{(c_1 \times m_1 + c_2 \times (1 - m_1))}$$

where $m_1$ is the confidence value in the existing location data of the gateway in response 110, $c_1$ is a predetermined value which indicates the probability density of the distance being d when the gateway is stationary, and $c_2$ is another predetermined value which indicates the probability density of the distance being d when the gateway is mobile.

For the fourth group of embodiments, updating operations 116 can determine the location estimate and the associated uncertainty value in the updated location data of the gateway through the exemplary process of updating operations 116 for the second group of embodiments as described above. In embodiments where the confidence value is a numerical value between 0 and 1, one exemplary process can be described as the following. Device 100 can determine a distance, d, between the location estimate in the updated location data of the gateway and the location estimate in the existing location data of the gateway in response 110. Device 100 can determine a dislocation ratio, $r_d$, to be the distance divided by the sum of, the uncertainty value in the existing location data of the gateway in response 110, $u_o$, and the uncertainty value in the updated location data, $u_n$, i.e. $r_d = \frac{d}{(u_o + u_n)}$.

Device 100 can determine the confidence value in the updated location data, $m_2$, to be $$m_2 = \frac{c_1 \times m_1}{(c_1 \times m_1 + c_2 \times (1 - m_1))}$$

where $m_1$ is the confidence value in the existing location data of the gateway in response 110, $c_1$ is a predetermined value which indicates the probability density of the dislocation ratio being $r_d$ when the gateway is stationary and its true geographic location is inside a geographic area defined by the location estimate and the associated uncertainty value in the existing location data, and $c_2$ is another predetermined value which indicates the probability density of the dislocation ratio being $r_d$ when the gateway is mobile or its true geographic location is outside the geographic area.

Updating operations 116 can send the created or updated location data and the identifiers of all detected gateway 118 to store 130. Store 130 can store them on device 100.

In some embodiments, when the condition is determined to be not true in condition checking operations 112, and when external location estimation operations 120 can not determine a location estimate of device 100, final location estimation operations 114 can determine the final location estimate of device 100 using the tentative location estimate as determined in tentative location estimation operations 106.

In some embodiments, store 130 can be configured to store additional data including time instants, identifiers of wireless access gateways detected at those time instants and closeness values between device 100 and corresponding detected gateways at those time instants.

In these embodiments, when final location estimation operations 114 can not determine a valid location estimate of device 100, local location data updating operations 116 can send data including time instant of detection in scanning operations 102, identifiers of the detected gateways and closeness values between device 100 and corresponding gateways to store 130. Store 130 can store them on device 100 persistently for retrospective location estimate of device 100 at stored time instant.

Details of Exemplary Processes

Figure 2:
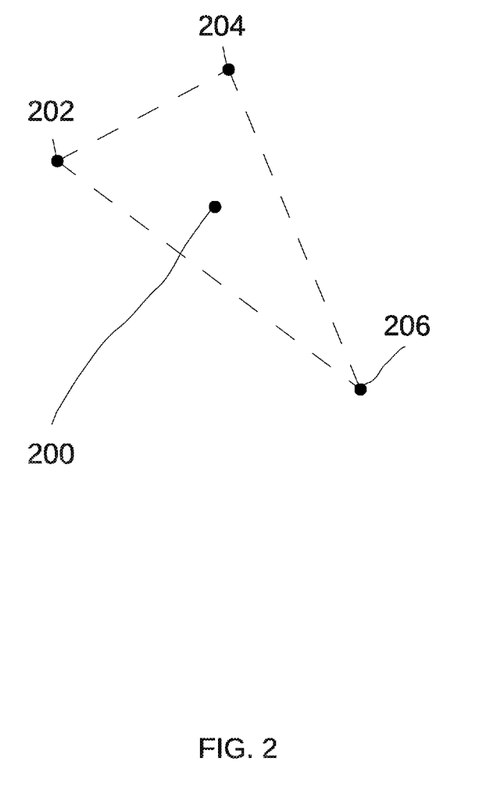
FIG. 2 is a diagram illustrating one exemplary process for determining a tentative location estimate of a mobile device using location estimates in existing location data.

FIG. 2 is a diagram illustrating one exemplary process for determining a tentative location estimate of a mobile device using location estimates in existing location data.

Device 100 can determined the latitude coordinate and the longitude coordinate of tentative location estimate 200 of device 100 to be the arithmetic mean of latitude coordinates and longitude coordinates in location estimates 202, 204, 206, respectively.

Figure 3:
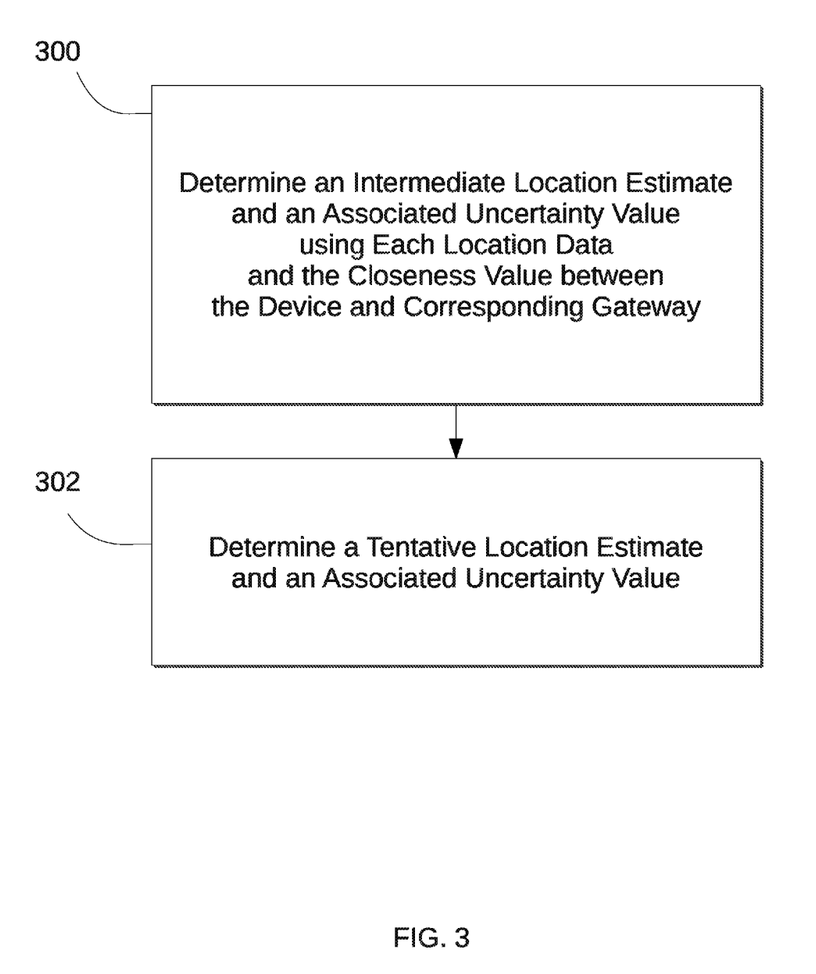
FIG. 3 is a flowchart of one exemplary process for determining a tentative location estimate of a mobile device and an associated uncertainty value, based on existing location data of detected wireless access gateways and the closeness values between the device and corresponding wireless access gateways.

FIG. 3 is a flowchart of one exemplary process for determining a tentative location estimate of a mobile device and an associated uncertainty value, based on existing location data of detected wireless access gateways and the closeness values between the device and corresponding wireless access gateways.

Device 100 can determine (300) an intermediate location estimate of device 100 and an associated uncertainty value using each location data in response 110, and the closeness value between device 100 and corresponding gateway. One exemplary process of 300 will be discussed in further details below in reference to FIG. 6.

Device 100 can determine (302) a tentative location estimate of device 100 and an associated uncertainty value using each intermediate location estimate of device 100 and the associated uncertainty value as determined in 300.

Device 100 can determine the tentative location estimate to be an invalid location estimate when no intermediate location estimate of device 100 can be determined in 300. Device 100 can determine the latitude coordinate and the longitude coordinate in the tentative location estimate to be the same as the latitude coordinate and the longitude coordinate in the only intermediate location estimate respectively, when only one intermediate location estimate of device 100 can be determined in 300. When two or more intermediate location estimates of device 100 can be determined in 300, device 100 can determine a geographic area, where the distance between any point in the area and each intermediate location estimate of device 100 is less than or equal to the uncertainty value associated with that intermediate location estimate. Device 100 can determine the tentative location estimate to be the geographical center of the area, and the associated uncertainty value to be half of the diameter of the area, when such area is not empty. Device 100 can determine the tentative location estimate to be any one of the intermediate location estimates of device 100, and the associated uncertainty value to be the corresponding uncertainty value, when such area is empty. An example of determining a tentative location estimate using two intermediate location estimates of device 100 is illustrated below in reference to FIG. 7.

Figure 4:
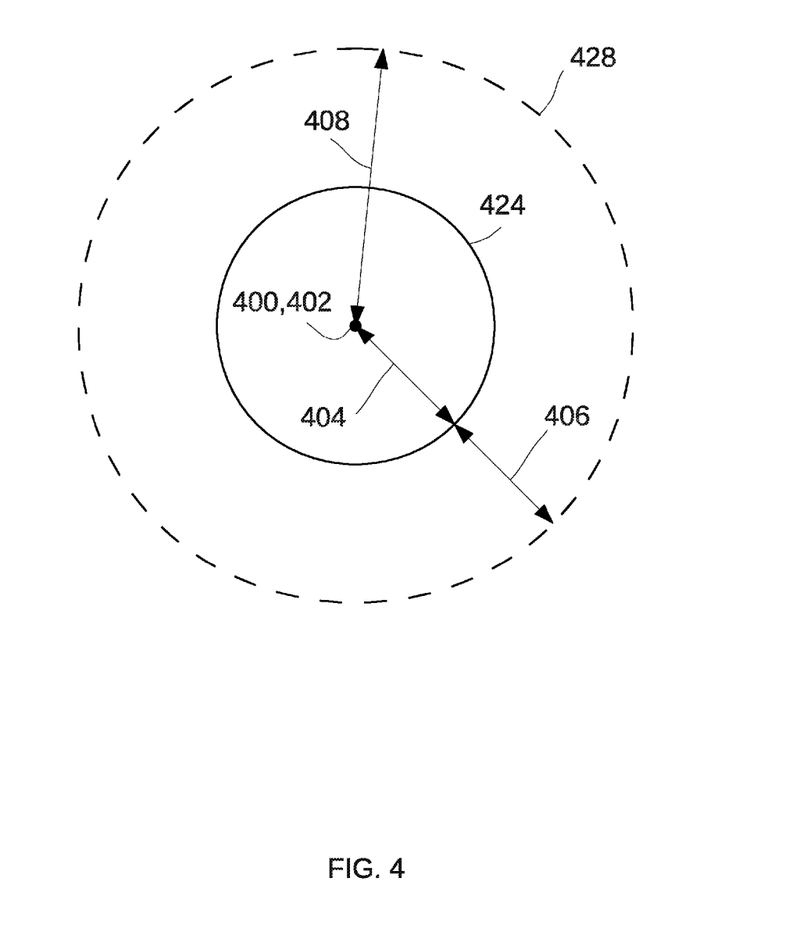
FIG. 4 is a diagram illustrating one exemplary process of creating location data for a wireless access gateway using a location estimate of a mobile device, the uncertainty value associated with that estimate, and the closeness value between the device and the gateway.

FIG. 4 is a diagram illustrating one exemplary process of creating location data for a wireless access gateway using a location estimate of a mobile device, the uncertainty value associated with that estimate, and the closeness value between the device and the gateway.

In some embodiments, device 100 can determine the latitude coordinate and the longitude coordinate in location estimate 400 in the created location data of the gateway to be the same as the latitude coordinate and the longitude coordinate in location estimate 402 of device 100, respectively. As a result, estimate 400 and estimate 402 are represented by the same point on FIG. 4. Device 100 can determine the uncertainty value associated with estimate 400 in the created location data of the gateway, $r_g$, represented by radius 408 of circle 428, to be the sum of, the uncertainty value associated with estimate 402, $r_m$, represented by radius 404 of circle 424, and the closeness value between device 100 and the gateway, d, represented by distance 406, i.e. $r=r_g=r_m+d$.

Figure 5:
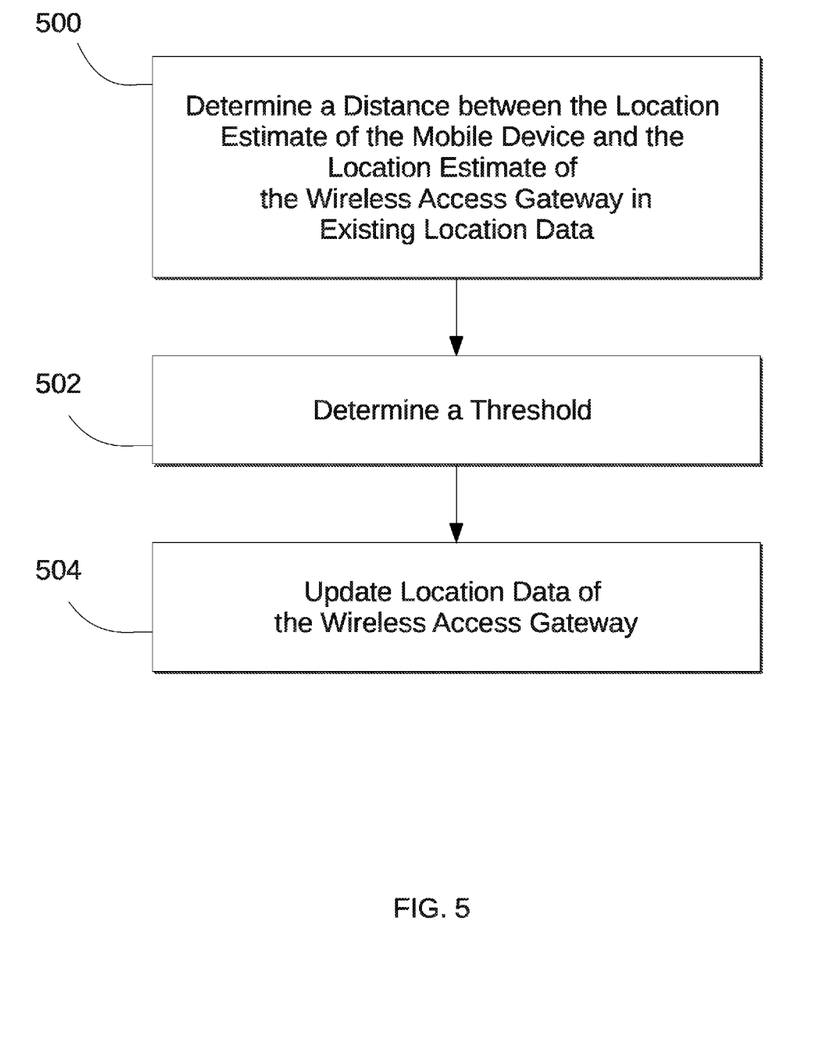
FIG. 5 is a flow chart of one exemplary process of updating the location data of a wireless access gateway using a location estimate of a mobile device, the uncertainty value associated with that estimate, the closeness value between the device and the gateway, and the existing location data of the gateway.

FIG. 5 is a flow chart of one exemplary process of updating the location data of a wireless access gateway using a location estimate of a mobile device, the uncertainty value associated with that estimate, the closeness value between the device and the gateway, and the existing location data of the gateway.

Device 100 can determine 500 a distance between the final location estimate of device 100 and the location estimate in the existing location data of the gateway in response 110.

Device 100 can determine 502 a threshold to be the sum of, the uncertainty value associated with the final location estimate of device 100, the uncertainty value in the existing location data of the gateway, and the closeness value between device 100 and the gateway.

Device 100 can update 504 the existing location data of the gateway, based on the distance and the threshold. One exemplary process of 504 can be described as following.

Device 100 can determine whether or not a condition is true, the condition being the distance is greater than or equal to the threshold. When the condition is true, device 100 can determine the latitude coordinate and longitude coordinate, in the location estimate of the updated location data to be the same as the latitude coordinate and longitude coordinate in the final location estimate of device 100. Device 100 can determine the uncertainty value in the updated location data to be the sum of, the uncertainty value associated with the final location estimate of device 100, and the closeness value between device 100 and the gateway.

When the condition is not true, one exemplary process for determining the location estimate and the associated uncertainty value in the updated location data of the gateway can be described below in reference to FIG. 8.

Figure 6:
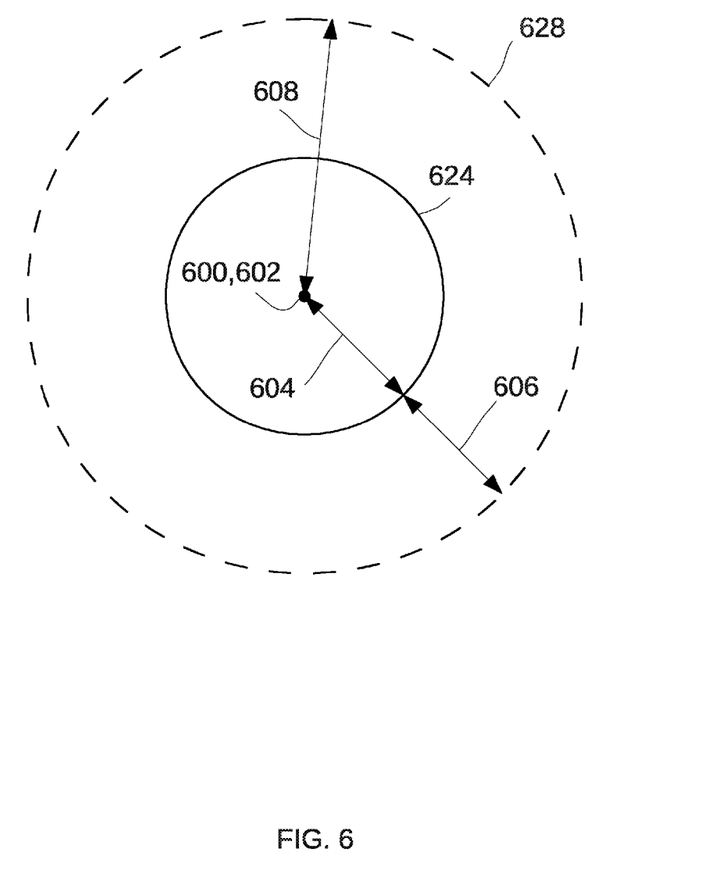
FIG. 6 is a diagram illustrating one exemplary process of determining an intermediate location estimate of a mobile device and an uncertainty value associated with the intermediate estimate using the location data of a wireless access gateway and the closeness value between the device and the gateway.

FIG. 6 is a diagram illustrating one exemplary process of determining an intermediate location estimate of a mobile device and an uncertainty value associated with the intermediate estimate using the location data of a wireless access gateway and the closeness value between the device and the gateway. Device 100 can determine the latitude coordinate and the longitude coordinate in the intermediate location estimate 600 of device 100 to be the same as the latitude coordinate and the longitude coordinate in location estimate 602 in the location data, respectively. As a result, estimate 600 and estimate 602 are represented by the same point on FIG. 6. The uncertainty value associated with estimate 600, $r_m$, represented by radius 608 of circle 628, can be determined to be the sum of, the uncertainty value associated with estimate 602, $r_g$, represented by radius 604 of circle 624, and the closeness value between device 100 and the gateway, d, represented by distance 606, i.e. $r_m=r_g+d$.

Figure 7:
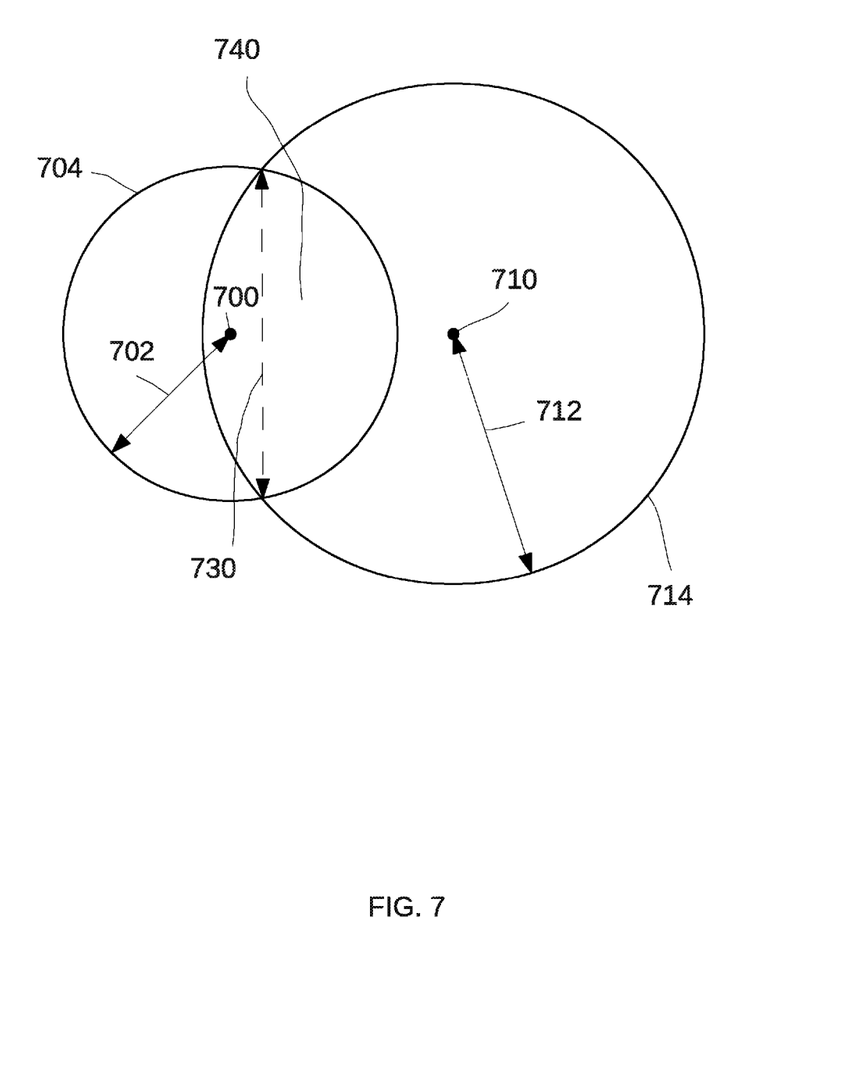
FIG. 7 is a diagram illustrating one exemplary process of determining a tentative location estimate of a mobile device using two intermediate location estimates of the device.

FIG. 7 is a diagram illustrating one exemplary process of determining a tentative location estimate of a mobile device using two intermediate location estimates of the device. Device 100 can determine the geographic area where the distance between any point in the area and intermediate location estimate 700 is less than or equal to the associated uncertainty value, $r_1$, represented by radius 702 of circle 704, and the distance between any point in the area and intermediate location estimate 710 is less than or equal to the associated uncertainty value, $r_2$, represented by radius 712 of circle 714, to be intersection 740. Intersection 740 can be the intersection between the disk enclosed by circle 704 and the disk enclosed by circle 714. Device 100 can determine the tentative location estimate to be the geographical center of intersection 740 and the uncertainty value associated with the tentative estimate to be half of diameter 730 of intersection 740.

Figure 8:
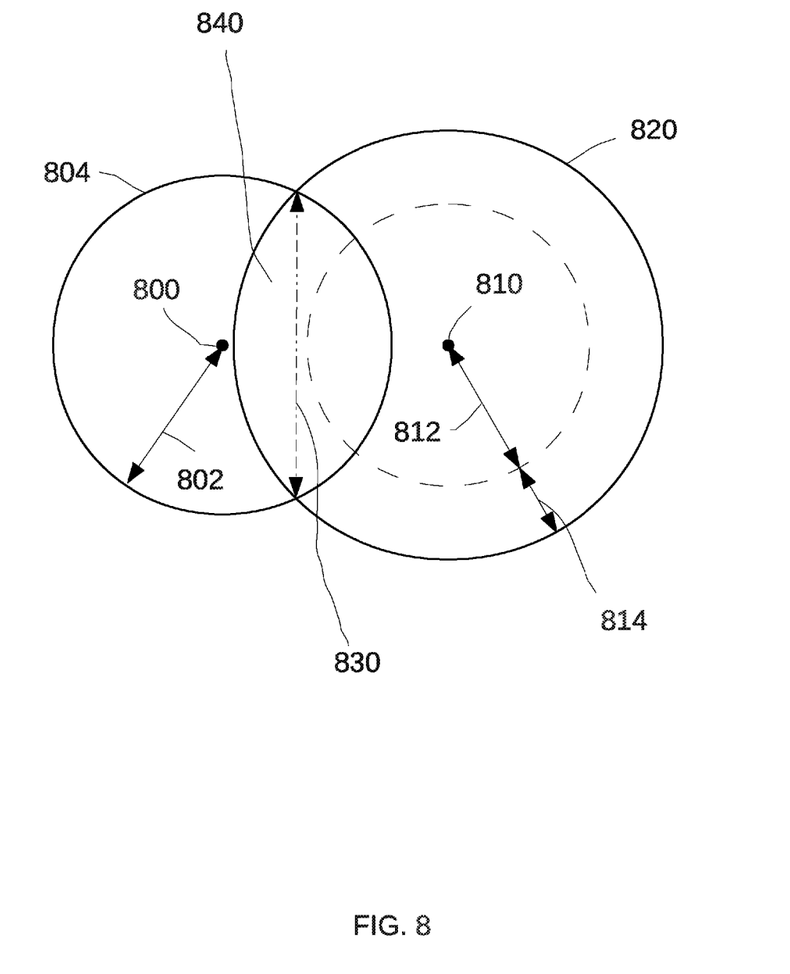
FIG. 8 is a diagram illustrating one exemplary process of determining the location estimate and the associated uncertainty value in the updated location data of a wireless access gateway when a given condition is not true.

FIG. 8 is a diagram illustrating one exemplary process of determining the location estimate and the associated uncertainty value in the updated location data of a wireless access gateway when a given condition is not true.

Device 100 can determine a first geographic area defined by final location estimate 810 of device 100, and an uncertainty value which is the sum of, the uncertainty value associated with estimate 810 as represented by radius 812, and the closeness value between device 100 and the gateway, as represented by distance 814, to be the disk enclosed by circle 820. Device 100 can determine a second geographic area defined by location estimate 800 in the existing location data of the gateway, and the associated uncertainty value, as represented by radius 802, to be the disk enclosed by circle 804. Device 100 can determine a third geographic area 840 to be the intersection between the first geographic area and the second geographic area. Device 100 can determine the location estimate in the updated location data to be the geographical center of area 840 and the associated uncertainty value in the updated location data to be half of diameter 830 of area 840.

Exemplary Component of a Location Estimation System Using Local Location Data

Figure 9:
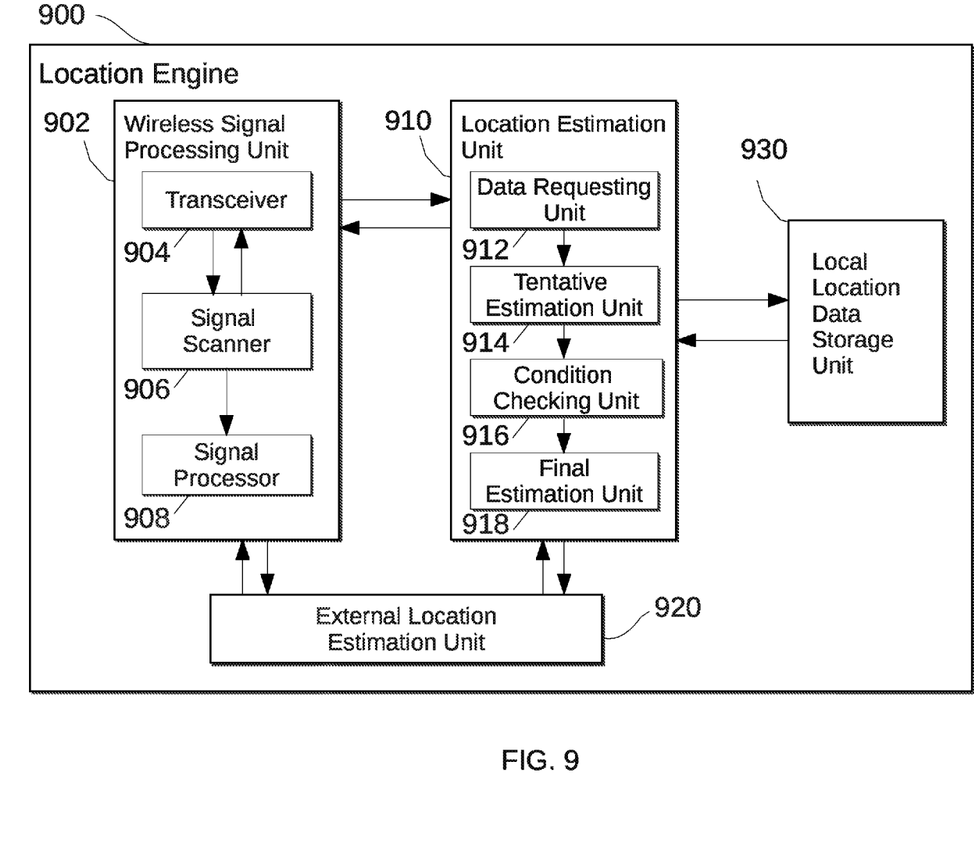
FIG. 9 is a block diagram illustrating functional components of an exemplary location estimation system.

FIG. 9 is a block diagram illustrating functional components of an exemplary location estimation system. System 900 can be a component of device 100 as described above in reference to FIG. 1.

System 900 can include local location data storage unit 930. Unit 930 can be a non-transitory data storage component of system 900 that is configured to store identifiers and location data of wireless access gateways and perform other operations required for location data store 130. In some embodiments, unit 930 can be configured to store additional data such as time instants, identifiers of detected wireless access gateways, closeness values between system 100 and detected gateways.

System 900 can include wireless signal processing unit 902. Unit 902 can include at least one of a processor for processing signals from a cell tower, a wireless processor (e.g., a WiFi™ chip) for processing signals from a wireless router, and a processor for processing other kinds of wireless signals. Unit 902 can include transceiver 904. Transceiver 904 is a component of unit 902 that is configured to send and receive wireless signals. Unit 902 can include signal scanner 906 and signal analyzer 908. Scanner 906 is a component of unit 902 that is configured to cause transceiver 904 to scan one or more communication channels to detect wireless signals from wireless access gateways (cell towers or wireless routers or others). The signals can include the identifiers of the wireless access gateways. Analyzer 908 is a component of unit 902 that is configured to analyze the detected wireless signals and determine the round trip time, the bit error rate, received signal strength indicator (RSSI) or other information that can indicate a closeness value between system 900 and the corresponding gateway. The closeness value can represent an estimate of a distance between system 900 and the gateway.

Unit 902 can send the identifiers of the detected wireless access gateways, as well as the information that can indicate the closeness values, to location estimation unit 910. Unit 910 is a component of system 900 that is configured to determine a location estimate of device 100. Unit 910 can include an application processor and computer instructions for controlling the application processor. Unit 910 can include data requesting unit 912. Unit 912 can be a component of unit 910 that is configured to request location data of each detected wireless access gateways using the identifiers sent by unit 902. Unit 912 can send the identifiers to unit 930 and receive location data from unit 930.

Unit 910 can include tentative estimation unit 914. Unit 914 is a component of unit 910 that is configured to perform tentative location estimation operations 106.

Unit 910 can include condition checking unit 916. Unit 916 is a component of unit 910 that is configured to perform condition checking operations 112.

Unit 910 can include final estimation unit 918. Final estimation unit 918 is a component of unit 910 that is configured to perform final location estimation operation 114.

System 900 can include external location estimation unit 920. Unit 920 can be a component of system 900 that is configured to perform external location estimation operations 120. Unit 920 can interact with unit 902.

What is claimed is:

1. A method implemented on a mobile device, comprising:
    detecting, on said mobile device, one or more wireless access gateways;
    for at least one detected wireless access gateway, determining whether or not location data of the wireless access gateway exists on said mobile device, said location data including at least one of:
        a location estimate of said wireless access gateway;
        an uncertainty value associated with said location estimate; or
        a confidence value related to at least one of:
            the likelihood that said wireless access gateway is stationary;
            the likelihood that the true geographic location of said wireless access gateway is inside a geographic area defined by said location estimate; or
            the likelihood that the true geographic location of said wireless access gateway is inside a geographic area defined by said location estimate and said uncertainty value; and
    determining whether or not a condition related to location estimation of said mobile device is true.

2. The method of claim 1, further comprising:
    determining a second location estimate of said mobile device, in response to the determination of said condition, using at least one of:
        a signal from a navigation satellite;
        data from another different computerized device; or
        a first location estimate of said mobile device, determined using at least one of:
            the existing location data on said mobile device, of one of the detected wireless access gateways; or
            an estimate of a distance between said mobile device and one of said detected wireless access gateways.

3. The method of claim 2, further comprising at least one of:
    updating the existing location data on said mobile device, of at least one detected wireless access gateway, using at least one of:
        said second location estimate;
        an uncertainty value associated with said second location estimate;
        an estimate of a distance between said mobile device and the detected wireless access gateway; or
        said existing location data on said mobile device of said detected wireless access gateway; or
    creating and storing on said mobile device, the location data of at least one detected wireless access gateway, using at least one of:
        said second location estimate;
        an uncertainty value associated with said second location estimate; and
        an estimate of a distance between said mobile device and the detected wireless access gateway.

4. The method of claim 1, wherein each detected wireless access gateway includes at least one of:
    a cell tower;
    a wireless router; or
    an apparatus capable of emitting wireless signals.

5. The method of claim 1, wherein said location estimate of said wireless access gateway includes a latitude coordinate and a longitude coordinate.

6. The method of claim 1, wherein said location estimate of said wireless access gateway includes a numerical or other code designating a predetermined geographic area.

7. The method of claim 1, wherein said uncertainty value indicates an estimation accuracy of said location estimate.

8. The method of claim 1, wherein said condition is determined to be true when at least one of the following is true:
    a value determined using the existing location data of the detected wireless access gateways satisfies a predetermined constraint; or
    a random value generated on said mobile device satisfies a predetermined constraint.

9. The method of claim 2, wherein said estimate of said distance between said mobile device and the detected wireless access gateway is based on at least one of:
    a signal strength of a signal from said detected wireless access gateway;
    a round-trip time of a signal between said mobile device and said detected wireless access gateway; or
    a bit error rate of a signal between said mobile device and said detected wireless access gateway.

10. The method of claim 2, wherein determining said first location estimate comprises:
for each existing location data of a detected wireless access gateway, determining an intermediate location estimate of said mobile device using at least one of:
the existing location data; or
an estimate of a distance between said mobile device and said detected wireless access gateway; and
determining said first location estimate of said mobile device using the intermediate location estimates.

11. A computer program product, tangibly stored on a non-transitory medium and configured to cause a mobile device to perform operations comprising:
detecting, on said mobile device, one or more wireless access gateways;
for at least one detected wireless access gateway, determining whether or not location data of the wireless access gateway exists on said mobile device, said location data including at least one of:
a location estimate of said wireless access gateway;
an uncertainty value associated with said location estimate; or
a confidence value related to at least one of:
the likelihood that said wireless access gateway is stationary;
the likelihood that the true geographic location of said wireless access gateway is inside a geographic area defined by said location estimate; or
the likelihood that the true geographic location of said wireless access gateway is inside a geographic area defined by said location estimate and said uncertainty value; and
determining whether or not a condition related to location estimation of said mobile device is true.

12. The product of claim 11, wherein said operations further comprising:
determining a second location estimate of said mobile device, in response to the determination of said condition, using at least one of:
a signal from a navigation satellite;
data from another different computerized device; or
a first location estimate of said mobile device, determined using at least one of:
the existing location data on said mobile device, of one of the detected wireless access gateways; or
an estimate of a distance between said mobile device and one of said detected wireless access gateways.

13. The product of claim 12, wherein said operations further comprising at least one of:
updating the existing location data on said mobile device, of at least one detected wireless access gateway, using at least one of:
said second location estimate;
an uncertainty value associated with said second location estimate;
an estimate of a distance between said mobile device and the detected wireless access gateway; or
said existing location data on said mobile device of said detected wireless access gateway; or
creating and storing on said mobile device, the location data of at least one detected wireless access gateway, using at least one of:
said second location estimate;
an uncertainty value associated with said second location estimate; or
an estimate of a distance between said mobile device and the detected wireless access gateway.

14. The product of claim 11, wherein each detected wireless access gateway includes at least one of:
a cell tower;
a wireless router; or
an apparatus capable of emitting wireless signals.

15. The product of claim 11, wherein said location estimate of said wireless access gateway includes a latitude coordinate and a longitude coordinate.

16. The product of claim 11, wherein said location estimate of said wireless access gateway includes a numerical or other code designating a predetermined geographic area.

17. The product of claim 11, wherein said uncertainty value indicates an estimation accuracy of said location estimate.

18. The product of claim 11, wherein the condition is determined to be true when at least one of the following is true:
a value determined using the existing location data of the detected wireless access gateways satisfies a predetermined constraint; or
a random value generated on said mobile device satisfies a predetermined constraint.

19. The product of claim 12, wherein said estimate of said distance between said mobile device and the detected wireless access gateway is based on at least one of:
a signal strength of a signal from said detected wireless access gateway;
a round-trip time of a signal between said mobile device and said detected wireless access gateway; or
a bit error rate of a signal between said mobile device and said detected wireless access gateway.

20. The product of claim 12, wherein determining said first location estimate comprises:
for each existing location data of a detected wireless access gateway, determining an intermediate location estimate of said mobile device using at least one of:
the existing location data; or
an estimate of a distance between said mobile device and said detected wireless access gateway; and
determining said first location estimate of said mobile device using the intermediate location estimates.

21. A system, comprising:
a transceiver for detecting, on a mobile device, one or more wireless access gateways;
a local location data storage unit configured to store identifiers and location data of one or more wireless access gateways, on said mobile device, the location data of a wireless access gateway including at least one of:
a location estimate of said wireless access gateway;
an uncertainty value associated with said location estimate; or
a confidence value related to at least one of:
the likelihood that said wireless access gateway is stationary;
the likelihood that the true geographic location of said wireless access gateway is inside a geographic area defined by said location estimate; or
the likelihood that the true geographic location of said wireless access gateway is inside a geographic area defined by said location estimate and said uncertainty value; and
a location estimation unit comprising:
one or more processors configured to perform the operation of determining whether or not a condition related to location estimation of said mobile device is true.

22. The system of claim 21, further comprising:
an external location estimation unit for estimating location of said mobile device using at least one of:
a signal from a navigation satellite; or
data from another different computerized device.

23. The system of claim 22, wherein said location estimation unit comprising one or more processors configured to perform at least one of:
- determining whether or not a condition related to location estimation of said mobile device is true;
- determining a first location estimate of said mobile device using at least one of:
  - the existing location data on said mobile device, of one of the detected wireless access gateways; or
  - an estimate of a distance between said mobile device and one of said detected wireless access gateways;
- determining a second location estimate of said mobile device, in response to the determination of said condition, using at least one of:
  - said first location estimate; or
  - a location estimate of said mobile device determined by said external location estimate unit;
- updating the existing location data on said mobile device, of at least one detected wireless access gateway, using at least one of:
  - said second location estimate;
  - an uncertainty value associated with said second location estimate;
  - an estimate of a distance between said mobile device and the detected wireless access gateway; or
  - said existing location data on said mobile device of said detected wireless access gateway; or
- creating and storing on said mobile device, the location data of at least one detected wireless access gateway, using at least one of:
  - said second location estimate;
  - an uncertainty value associated with said second location estimate; or
  - an estimate of a distance between said mobile device and the detected wireless access gateway.

24. The system of claim 21, wherein each detected wireless access gateway includes at least one of:
- a cell tower;
- a wireless router; or
- an apparatus capable of emitting wireless signals.

25. The system of claim 21, wherein said location estimate of said wireless access gateway includes a latitude coordinate and a longitude coordinate.

26. The system of claim 21, wherein said location estimate of said wireless access gateway includes a numerical or other code designating a predetermined geographic area.

27. The system of claim 21, wherein said uncertainty value indicates an estimation accuracy of said location estimate.

28. The system of claim 21, wherein said condition is determined to be true when at least one of the following is true:
- a value determined using the location data of at least one of the detected wireless access gateways, stored in said local location data storage unit, satisfies a predetermined constraint; or
- a random value generated on said mobile device satisfies a predetermined constraint.

29. The system of claim 23, wherein said estimate of said distance between said mobile device and the detected wireless access gateway is based on at least one of:
- a signal strength of a signal from said detected wireless access gateway;
- a round-trip time of a signal between said mobile device and said detected wireless access gateway; or
- a bit error rate of a signal between said mobile device and said detected wireless access gateway.

30. The system of claim 23, wherein determining said first location estimate comprises:
- for each existing location data of a detected wireless access gateway, determining an intermediate location estimate of said mobile device using at least one of:
  - the existing location data; or
  - an estimate of a distance between said mobile device and said detected wireless access gateway; and
- determining said first location estimate of said mobile device using the intermediate location estimates.

* * * * *